United States Patent [19]
Lynch et al.

[11] Patent Number: 5,587,074
[45] Date of Patent: Dec. 24, 1996

[54] FLUID FILTER WITH ENHANCED BACKFLUSH FLOW

[75] Inventors: Gerard J. Lynch, Bridgewater; Joseph Quinn, Kearny, both of N.J.

[73] Assignee: H-Tech, Inc., Del.

[21] Appl. No.: 390,134

[22] Filed: Feb. 17, 1995

[51] Int. Cl.⁶ .................................................. B01D 29/68
[52] U.S. Cl. ........................................... 210/411; 210/415
[58] Field of Search .................................... 210/413, 414, 210/415, 791, 411

[56] References Cited

U.S. PATENT DOCUMENTS

| | | |
|---|---|---|
| 1,977,601 | 10/1934 | Winton . |
| 2,066,479 | 1/1937 | MacIsaac . |
| 2,835,390 | 5/1958 | King . |
| 3,017,029 | 1/1962 | Berninger . |
| 3,074,556 | 1/1963 | Rosaen . |
| 3,074,560 | 1/1963 | Kinney . |
| 3,168,467 | 2/1965 | Dreyer . |
| 3,256,995 | 6/1966 | Schmid . |
| 3,357,566 | 12/1967 | Schmid et al. . |
| 3,574,509 | 4/1971 | Zentis et al. . |
| 3,635,348 | 1/1972 | Carr . |
| 4,045,591 | 8/1977 | Payne . |
| 4,284,138 | 8/1981 | Allred . |
| 4,328,103 | 5/1982 | Kraeling, Jr. et al. . |
| 4,470,859 | 9/1984 | Benezra et al. . |
| 4,610,786 | 9/1986 | Pearson . |
| 4,643,828 | 2/1987 | Bareuza . |
| 4,818,402 | 4/1989 | Steiner . |
| 5,114,581 | 5/1992 | Goldsmith et al. . |
| 5,152,891 | 10/1992 | Netkowicz et al. . |
| 5,156,780 | 10/1992 | Kenigsberg et al. . |

FOREIGN PATENT DOCUMENTS

| | | |
|---|---|---|
| 605103 | 8/1931 | Germany . |
| 2260406 | 6/1973 | Germany . |
| 2237912 | 2/1974 | Germany . |
| 3431396 | 3/1986 | Germany . |
| 3611075 | 10/1987 | Germany . |
| 52-32175 | 11/1977 | Japan . |
| 55-1186 | 3/1980 | Japan . |
| 59-80308 | 5/1984 | Japan . |

OTHER PUBLICATIONS

"Handbook of Hydraulic Resistance", second edition, 1986, Henisphere Publishing Corp., revised and augmented, by I. E. Idelchik.

"Flow of Fluids through Valves, Fittings, and Pipe", by the Engineering Division, Technical Paper No. 10, 1985 Crane Co.

Webster's New World Dictionary © 1988 Simon & Schuster Inc., 3rd College Edition. pp. 1435, "trumpet".

*Primary Examiner*—Thomas M. Lithgow
*Attorney, Agent, or Firm*—Selitto & Associates

[57] ABSTRACT

A backflush conduit for an automatic back flushing filter having an inlet portion with a symmetrical converging bell-shaped cross-section, an outlet portion with a generally cylindrical shape, and a converging and reorienting transition portion connecting the inlet and outlet portions. Converging convex surfaces of the bell shaped opening smooth fluid inflow and prevent fulid separation. The transition portion interior contour redirects the fluid flow without inducing turbulence, resulting in more efficient backflushing to clean the entire filter element even at small element pore sizes.

7 Claims, 8 Drawing Sheets

FIG. 8
FIG. 9
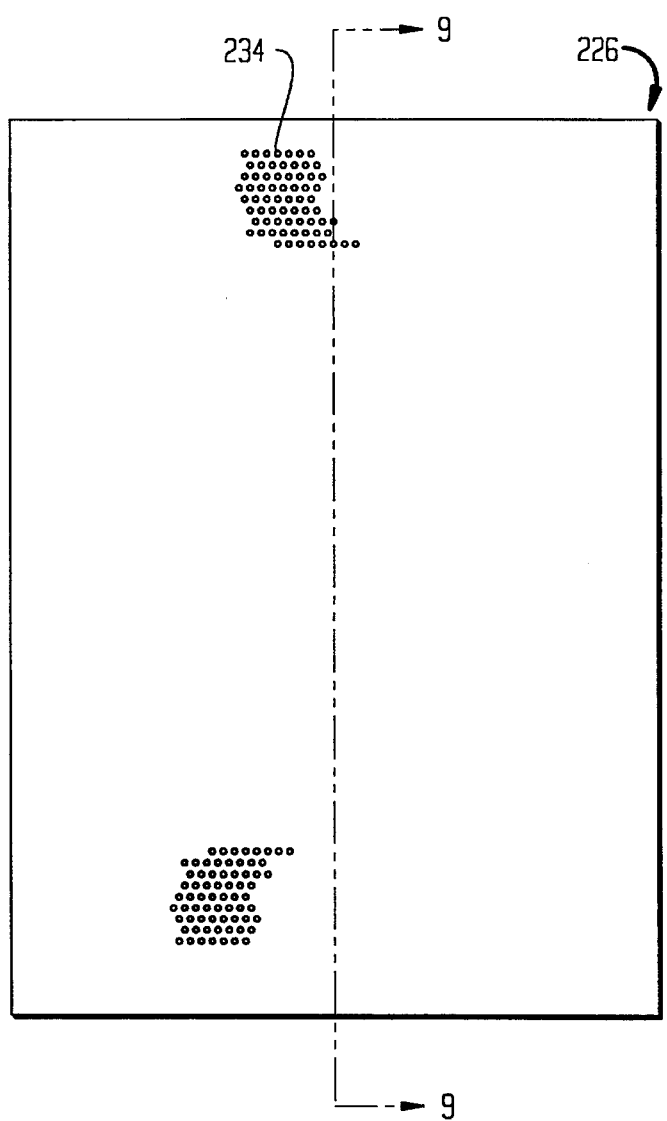
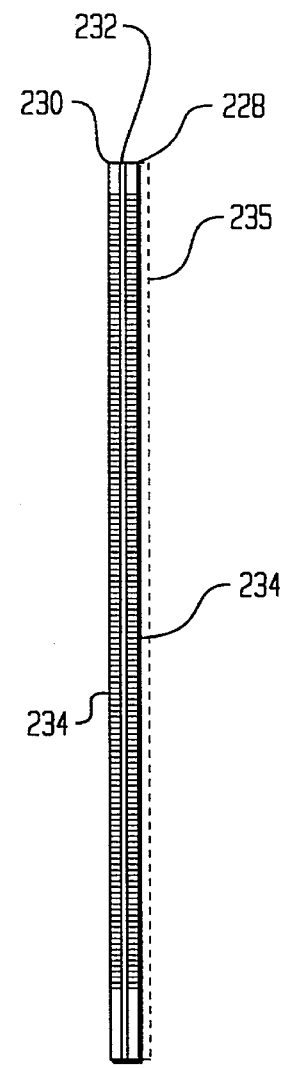

FLUID FILTER WITH ENHANCED BACKFLUSH FLOW

FIELD OF THE INVENTION

The present invention relates to devices for separating solids from liquids, and more particularly to automatic backflushing filters having a movable backflush conduit for removing debris from the debris collecting surface of a filter element.

BACKGROUND OF THE INVENTION

The field of automatic backflushing fluid filters is replete with various designs that have been proposed over the years, both in the United States and abroad. Many of these designs employ a fluid filtering element which filters debris from a stream of fluid that is pumped through the element under pressure. Certain of these designs utilize a generally cylindrical filter element in which fluid flow passes from the interior of the filter element, through the element, to the exterior and out of the filter housing. As debris is collected upon the filtering or interior surface of the filter element, fluid flow through the filter is reduced and the pressure differential between the inlet and outlet of the filter rises, that is, the filter element becomes clogged with debris. Of those automatic backflushing filters having a generally cylindrical filter element, some are provided with a rotating backflush conduit located within the interior cylindrical surface of the filter element. The backflush conduit has an internal fluid passageway which serves as a receptacle for reversed fluid flow through the element during backflushing, such that debris collected on the interior peripheral surface is washed from the filter element through the backflush conduit and out to waste.

Typically, downstream pressure beyond the filter element is utilized to create a reverse flow through the element during back flushing. Namely, when a backflush conduit with an outlet which vents to atmospheric pressure is positioned in proximity to the interior peripheral surface of the filter element, the downstream head pressure exerted on the exterior of the screen element causes a reverse flow through the element into the low pressure backflush port. The reverse flow dislodges contaminants which are clogging the element. The foregoing mode of operation allows the automatic backflushing filter to be cleansed without disassembly and even without stopping the normal filtering operation of the filter, in that only the portion of the filter element proximate the inlet of the backflush conduit is reverse flushed to waste.

While the preceding description of known automatic backflushing apparatus has referred to the use of generally cylindrical filter elements, numerous other variations have been employed, such as truncated cones and rectangular filter elements over which reciprocates a backflush conduit. The teachings of the present invention are applicable to any of these variations as shall be apparent from the description of the invention which follows below. Similarly, automatic backflushing filters with cylindrical filter elements have been proposed wherein the fluid flow is from the exterior surface of the filter element to the interior. Designs of this type would be amenable to incorporating the teachings of the present invention as well.

Automatic backflushing filters have diverse uses in various environments, such as the filtering of waste water and working fluids in mills, factories, and sewage systems; filtering the particulates from crude oil; filtering cooling water for nuclear reactors; and in many other industrial, municipal and environmental applications, wherever fluid is processed by the removal of solids, particulates and debris. In those applications requiring the filtering of water taken from naturally occurring sources such as rivers, bays, lakes and streams, biological matter is frequently a prime contaminant. In many countries of the world, and more recently in the Americas, natural bodies of water have become the breeding ground for the zebra mussel, a small mollusk which has come to constitute a major concern with regard to its capacity to clog water supply lines and treatment facilities. The zebra mussel constitutes a particularly challenging problem for fluid systems engineers in that the mussel is very small, on the order of 40 Microns, but great in number. A contaminant of this size is especially hard to remove from automatic backflush filters, in that, to achieve a filter of pore size small enough to catch Zebra mussels, there is a decrease in open area ratio, i.e., the ratio of open area or pore area to closed area. A reduction in open area corresponds with an increased upstream/downstream pressure differential and a decrease in fluid flow, both in the forward and reverse directions. As a result, fluid processing rates are decreased and backflushing efficiency is deprecated. This necessitates frequent backflushing which translates to increased operational costs.

It is an objective in automatic backflush filter design to decrease the time that backflushing is carried out to prevent the loss of fluid to waste and to avoid unnecessary energy expenditure in moving the backflush conduit and diverting fluid pressure to backflushing rather than filtering purposes. It is also desirable for the backflushing operation to be effective in removing the maximum quantity of debris from the filter element. Ideally, all debris is cleaned from the filter element by backflushing. Known designs have employed various schemes for increasing the efficiency and effectiveness of the backflushing cycle in automatic backflushing filters. For example, scrapers, brushes, cutters and sprayers have been proposed as attachments to the backflush conduit for removing the debris cake from the filtering side of the element. Nevertheless, room for improvement exists.

Extensive effort has also been expended in producing filter elements or screens which facilitate filtering, have a long life, a reasonable cost, and promote effective backflushing. For example, convoluted perforated screens, elements having a plurality of stacked disc elements, elements made from wedge wire and perforated steel, have all been explored. Nevertheless, concerns relating to open area ratio and pore size limitations persist.

One limitation that is frequently present in automatic backflushing filters that arises from characteristics of the filter element, as well as the backflush conduit, is the failure of the backflushing apparatus to effectively and efficiently clean the entirety of the filter element. Typically, the flow pattern into the backflush conduit inlet port is not evenly distributed over the entirety of the port. In addition, flow through the port and conduit are constricted and turbulent, diminishing flow rate. As a result, the reverse flow through the filter element to the backflush outlet is not evenly distributed nor of maximum rate, leading to areas of the filter element that are not cleaned during backflushing. This condition is exacerbated by screens with poor backflush debris release characteristics and low open area ratio.

The present invention discloses a backflush conduit with an internal contour providing an enhanced flow therethrough leading to augmented reverse or backflush flow through the filter element during backflushing. This enhanced flow is more evenly distributed over the backflush conduit inlet port aperture such that the filter element is subjected to a more even cleaning during backflushing to avoid areas of ineffective or no cleaning of the filter element. Because there is an enhanced backflush flow though the backflush conduit, filter elements with smaller pore size and a lower open area ratio may be effectively used and cleaned with the backflush conduit of the present invention. This is particularly efficacious with respect to the removal of Zebra mussels. Backflushing is further facilitated by a filter element design with enhanced debris release characteristics.

SUMMARY OF THE INVENTION

The problems and disadvantages associated with conventional automatic backflush filters utilized to remove debris from fluids are overcome by the present invention which includes a backflush conduit for an automatic backflushing filter having an inlet portion with a bell-shaped cross-section, an outlet portion with a generally cylindrical shape; and a transition portion connecting the inlet and outlet portions.

BRIEF DESCRIPTION OF THE FIGURES

For a better understanding of the present invention, reference is made to the following detailed description of an exemplary embodiment considered in conjunction with the accompanying drawings, in which:

FIG. 8 is an elevational view of a filter element for use in the filter apparatus shown in FIG. 1;

FIG. 9 is a cross-sectional view of the filter element of FIG. 8 taken along line IX—IX and looking in the direction of the arrows;

DETAILED DESCRIPTION OF THE FIGURES

Figure 1:
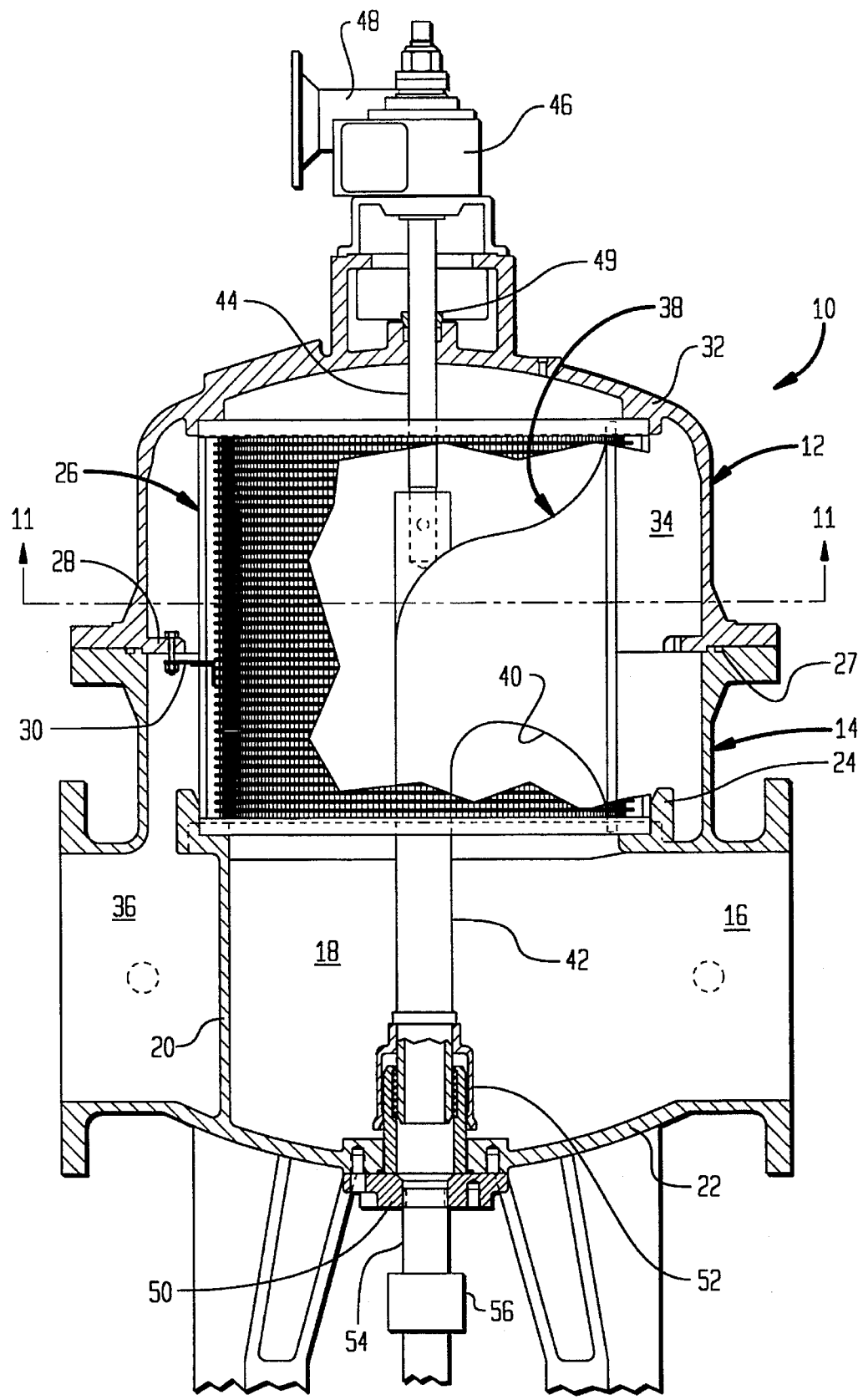
FIG. 1 is a cross-sectional view of an automatic backflushing filter in accordance with an exemplary embodiment of the present invention.

FIG. 1 shows an automatic backflushing filter 10 having an upper housing portion 12 and a lower housing portion 14. The lower portion 14 has a fluid inlet 16 for receiving a flow of fluid to be filtered of debris. The fluid inlet 16 communicates with a generally cylindrical space or settling chamber 18 defined by interior side wall 20 and bottom wall 22. An annular flange 24 crowns sidewall 20 and space 18 forming a seat for sealably receiving the bottom surface of a filter element 26. The filter element 26 is in the form of a hollow cylinder with the interior hollow communicating with space 18. The upper housing portion 12 is removably, sealably attached to the lower portion 14 via mating bolts and flanges on the respective portions, a sealing clamp ring, or in some other conventional manner for retaining and compressing the upper and lower portions together in sealing engagement with an O-ring seal 27. The filter 10 is provided with upper and lower portions 12, 14 to enable assembly and maintenance, in particular, to permit the filter element 26 to be serviced. In the embodiment shown in FIG. 1, the filter element 26 is bolted to the upper portion 12 via mating tabs 28, 30 extending from the upper portion 12 and filter element 26, respectively. A second annular seat 32 is formed from a downwardly extending prominence on the interior surface of the upper portion 12. The seat 32 sealably receives the upper edge surface of the filter element 26 upon attachment of the element 26 to the upper portion 12. When the upper and lower portions of housing 12, 14 are assembled with the filter element 26 sealingly engaging the upper and lower seats 32, 24 the interior volume of the filter 10 is divided into an upstream portion for receiving fluid which has not yet passed through the filter element 26 and a downstream portion which receives and carries fluid that has passed through the element 26. To effect filtration of fluid, a fluid under pressure, e.g., supplied by a pump, is directed into the inlet 16, fills space 18 and the hollow interior of the element 26. The pressurized fluid passes through the pores or open area of the filter element 26. Debris in the fluid which is larger than the pore size of the element 26 is collected on the interior cylindrical surface of the element 26. Fluid passing through the element 26 enters the annular space 34 and is discharged from the filter via filter outlet 36. In most installations, the outlet 36 is connected to piping which supplies fluid to a system or reservoir containing a large volume of fluid relative to the volume contained within the filter itself, e.g., a heat exchanger core in a cooling tower. As a result, back pressure is exerted by the fluid system downstream of the outlet 36 upon the fluid on the downstream side of the filter element. One might note at this point that if there is any restriction in flow, either internal to the filter, in the outlet 36, or in a nozzle attached to the outlet 36, such that the downstream portion of the filter volume is filled as a consequence of fluid input rate, then there will be a resultant back pressure. For filtering, the inlet pressure must therefor exceed the back or head pressure of the outlet. Besides constituting a force which must be overcome by the inlet supply system, back pressure can be utilized for backflushing, as shall be explained below in continuing reference to FIG. 1.

The interior cylindrical space of the element 26 receives a rotatable backflush conduit 38 having a flared debris collection head 40 and an outlet tube 42. The backflush conduit 38 is suspended by a rotary motion input shaft 44 which is pinned or otherwise affixed to a prominence extending from the collection head portion of the backflush conduit. The input shaft 44 emanates from a speed reduction gear box 46 for transmitting rotary motion from an electric motor 48 for turning the backflush conduit 38. The gear box 46 is bolted or otherwise affixed to the upper portion 12 of the filter housing. A seal 49 prevents fluid from leaking from the filter. The backflush conduit 38 is hollow and has a continuous internal passageway starting at an inlet aperture 58 (see FIG. 2) of the collection head 40 and extending through the outlet tube 42. The outlet tube 42 also serves as a mechanical shaft for maintaining a stable axis of rotation for the backflush conduit 38. A lower sleeve bushing housing 50 received within a mating bore in the bottom wall 22 and sealingly retained by bolts or other means, protrudes upwardly into the space 18, toward and in axial alignment with the outlet tube 42. The sleeve housing 50 retains a sleeve 94 within an internal bore therethrough for receiving the lower end of the backflush outlet tube 42, as shall be more fully explained and illustrated in reference to FIG. 9 below. A backflush conduit guide 52 press fit, pinned or otherwise affixed to the lower end of the outlet tube 42 both supports and seals the outlet tube's engagement with the lower sleeve bushing retained in sleeve housing 50. The guide 52 seals out debris and minimizes bypass of input fluid present in space 18. This results in more efficient backflushing and filtration. The sleeve housing 50 receives waste fluid from the backflush conduit and transmits it to a waste line 54. Typically, the waste line 54 is selectively vented to atmospheric pressure, i.e., there is no appreciable back pressure in the waste line when a backflush valve 56 controlling flow therethrough is opened.

Assuming that a filter as depicted in FIG. 1 has been running in filtration mode with the backflush outlet closed and that an appreciable amount of debris has collected upon the interior of the filter element hindering flow and raising the differential pressure between inlet and outlet to an unacceptable level, backflushing is indicated. To institute backflushing, the backflush control valve 56 is opened such that the backflush line 54 is vented to atmospheric pressure or a low pressure reservoir. Simultaneously, motor 48 is started setting the backflush conduit 38 into rotation with the inlet aperture 58 thereof in close proximity to the interior peripheral surface of the filter element 26. Since the backflush inlet aperture 58 is in close proximity to the filter element 26, only a controlled amount of fluid is permitted to pass from the high pressure downstream side of the filter element 26 through the space between the backflush conduit 38 and the filter element 26 and into the backflush conduit 38. Accordingly, a low pressure exists in the backflush conduit 38 relative to the head pressure existing on the downstream side of the filter element 26 inducing a reverse flow of fluid from the downstream side of the element to the upstream side. Since debris to be removed is packed onto the filter element 26 by the normal filtration flow, a reverse flow is effective to unpack the debris from the element 26. As the backflush conduit 38 is rotated, the aperture 58 passes over the entire internal surface of the filter element 26 cleaning the element via the aforesaid reverse flow which carries debris from the element pores into the backflush conduit 38 and out the waste line 54. Due to the fact that the reverse backflush flow only occurs in the area proximate the aperture 58, normal filtering operation is maintained during backflushing utilizing the element areas which are not undergoing backflushing. Having now set forth the general operation of the present invention, the backflush conduit 38 shall be described in more detail below in reference to FIGS. 2–9.

Figure 2:
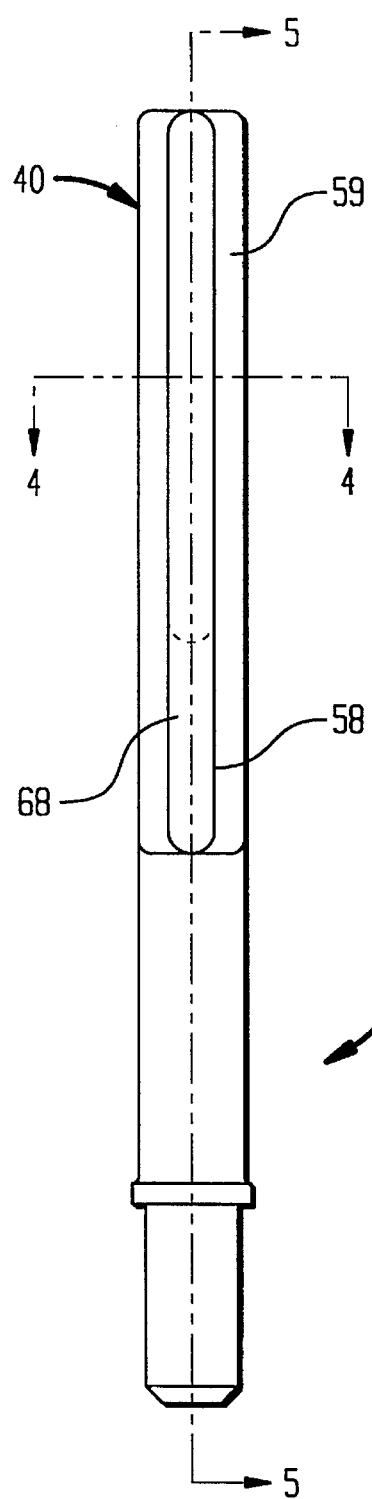
FIG. 2 is an elevational view of the backflush conduit of the filter shown in FIG. 1.
Figure 3:
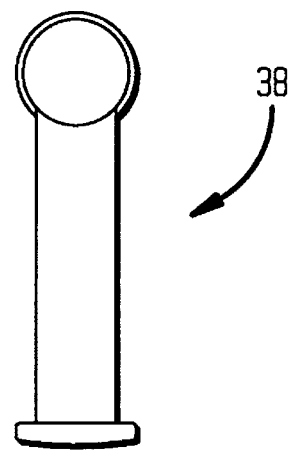
FIG. 3 is a plan view of the backflush conduit shown in FIG. 2.
Figure 4:
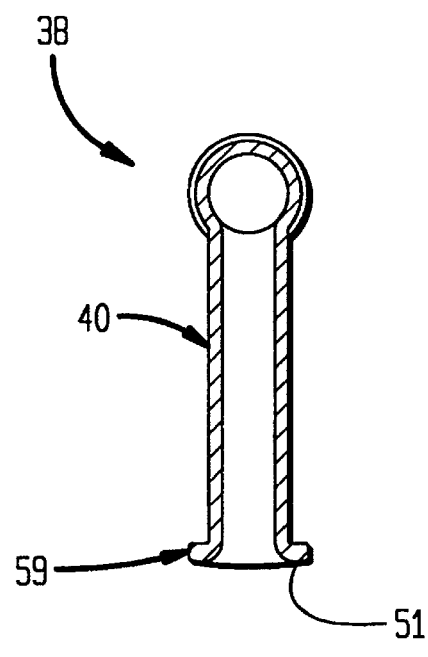
FIG. 4 is a cross-sectional view of the backflush conduit of FIG. 2, taken along section line IV—IV and looking in the direction of the arrows.

FIG. 2 shows the backflush conduit 38 with the inlet aperture 58 facing the viewer. A peripheral lip 59 serves as both a mechanical buffer to prevent debris from jamming between the backflush conduit 38 and the element 26 and as a means for modulating fluid flow from the upstream side of the element into the backflush conduit 38. FIG. 3 is a top plan view of the backflush conduit 38. FIG. 4 is a cross-sectional view of the collection head 40 portion of the backflush conduit 38. Preferably, the outer edge 51 of the peripheral lip 59 is sharp.

Figure 5:
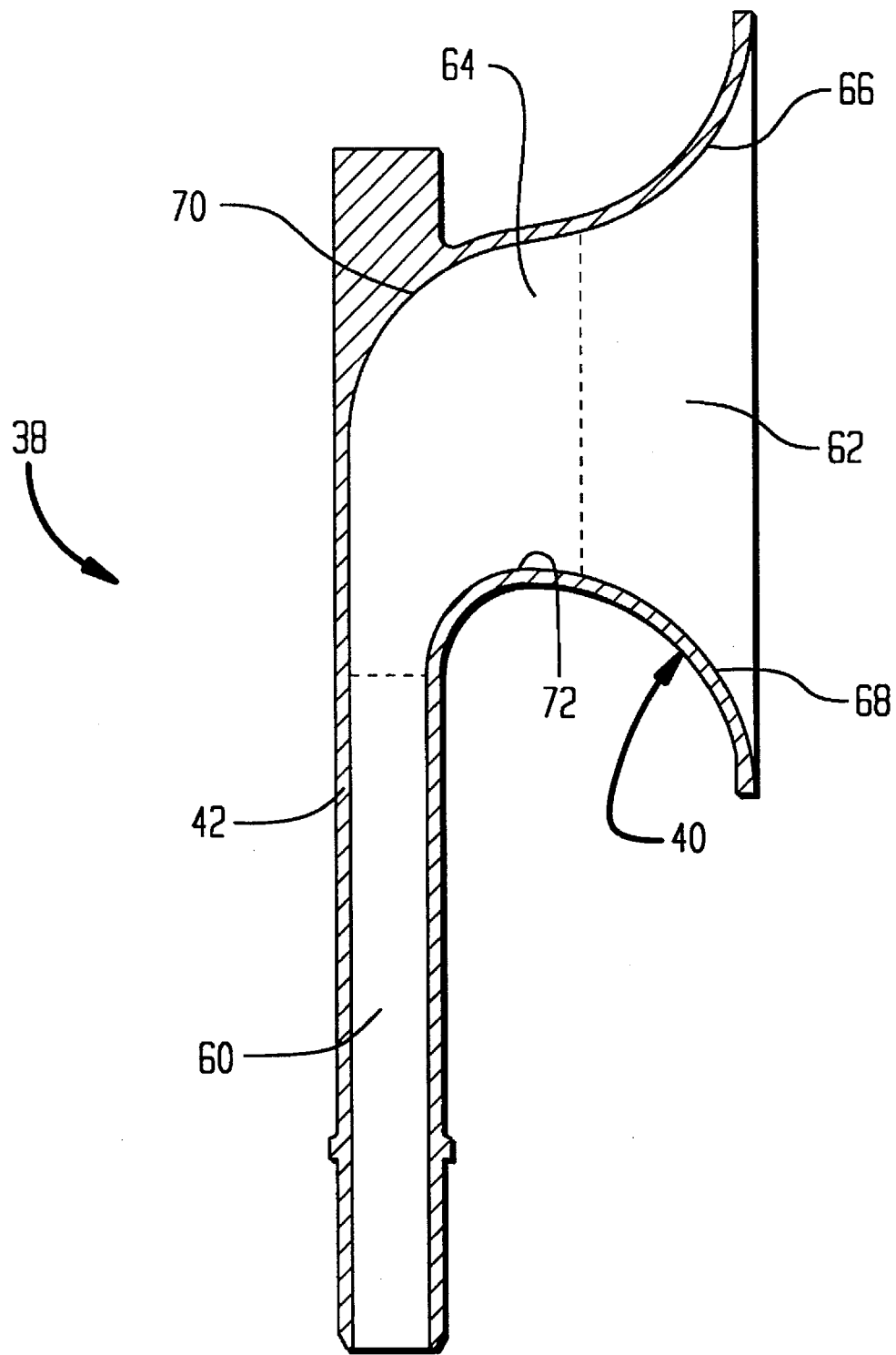
FIG. 5 is a cross-sectional view of the backflush conduit of FIG. 2, taken along section line V—V and looking in the direction of the arrows.

FIG. 5 shows an important aspect of the present invention, viz., the internal contours of the backflush conduit 38. While the internal contour largely determines the external backflush conduit configuration in most instances, the external configuration has relatively little effect upon the operation of the filter. The interior contour, however, has a very significant effect upon backflushing effectiveness and efficiency, in that the internal contour determines, to a large degree, the volume and rate of backflush flow. To applicant's knowledge, previous backflush conduit designs were oblivious to the impact that the interior contour has on backflush efficiency and effectiveness. The present invention both recognizes the significance of backflush conduit internal contour and provides a contour that increases the rate of flow through the backflush conduit at a given pressure, thereby improving backflushing effectiveness. In addition, by providing a properly contoured internal passageway through the conduit, flow rates through the inlet aperture 58 (see FIG. 2) can be balanced from the top of the aperture 58 to the bottom, resulting in a backflushing process that cleans filter elements evenly from top to bottom. This eliminates a failure of the backflushing process to remove debris from the element 26 along bands corresponding to regions of low backflush flow rate. As shown in FIG. 5, the interior contours of a backflush conduit in accordance with the present invention may be conceptually divided into three regions, 60, 62 and 64, (shown delimited by dotted lines). Region 60 is delimited by a straight cylindrical tube, i.e., outlet tube 42. Tube 42, as well as the remainder of the backflush conduit, may be fabricated or cast. The diameter, length and wall thickness chosen for the tube 42 is determined by factors such as maximum desired backflush flow at a given pressure, overall size of the filter and filter element and requirements for mechanical strength based upon overall size and filtering application. For a given tube length and diameter, there is little that can be done to improve flow through region 60 by changes in contour, except to insure that the interior walls are smooth. A substantially symmetrical, bell-shaped opening region 62 is defined by upper and lower interior convex surfaces 66, 68. These convex surfaces 66, 68 converge in the direction of backflush flow and their distal ends define the upper and lower edges of the inlet aperture 58 (See FIG. 2). The distance between the distal ends of the convex surfaces 66, 68 is determined by the filter element 26 height, in that the aperture 58 is intended to be coextensive with the filter element to ensure cleaning of the entire element. A ninety degree turn and convergent reduction and transition region 64 connects the other two regions, 60, 62. The transition region 64 is defined by a concave upper surface 70 and a convex lower surface 72. Each of these regions, 60, 62, 64 has been designed to maximize flow therethrough and minimize dead spots, as shall be described more fully below in reference to FIG. 6. The flow through prior art backflush conduits exhibits excessive turbulence, boundary layer separation arising from the divergence of turbulent laminar flow, and "dead spots". Turbulence may be defined as fluid motion which is not in the general direction of backflush flow, such as eddy currents and vortex flow. Since turbulent flow has components of motion non-parallel to the backflush pathway, it gives rise to increased fluid friction due to increased fluid impingement upon the sides of the conduit and also retrograde motion arising from components of motion opposite to backflush flow direction. Both of these effects reduce backflush flow rate at a given pressure and thus diminish backflushing effectiveness. In addition, high turbulence can result in flow separation such that areas of rarefaction or vacuum occur which occupy backflush conduit volume to the exclusion of fluid flow. The merging of separated flows also gives rise to turbulence or fluid motion that is not in the direction of backflushing flow, as described previously. Further, if the rate of fluid flow through a conduit is grossly uneven, then "dead spots" or areas of inadequate flow result. Dead spots proximate to the opening aperture to the backflush conduit result in ineffective or no backflushing of the filter element in the areas of low flow. One means for overcoming reduced flow attributed to turbulence and dead spots is to increase fluid pressure in the filter. Of course, an increase in fluid pressure requires more power on the upstream side to generate an increased pressure downstream for creating backflush flow. This is energy intensive and the increased flow velocity raises the differential pressure across the filter element. Another means of increasing downstream pressure to induce backflushing flow is to restrict the output volume of the filter, but reduced filter output is to be avoided. Both of these alternatives are therefore undesirable.

Figure 6:
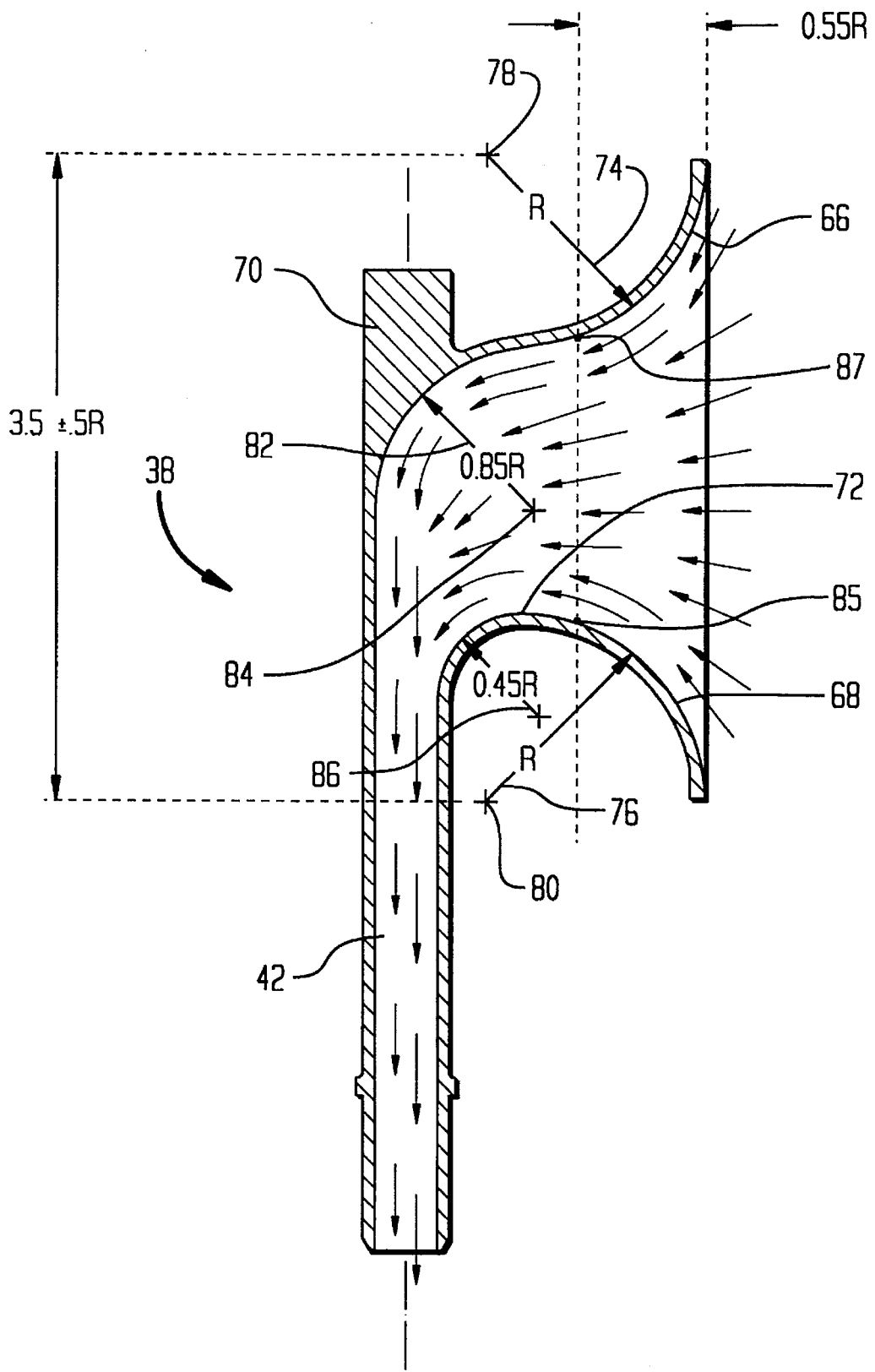
FIG. 6 is the backflush conduit of FIG. 5 diagrammatically showing fluid flow therethrough and the radii of curvature defining the contours of the interior passageway.

FIG. 6 illustrates the basic flow pattern which may be realized by the internal backflush conduit contour of the present invention. An important consequence of the contour shown is the avoidance of excessive turbulence, boundary layer separation arising from diverging flow, and "dead spots". These beneficial objectives are realized by virtue of the overall contour of the backflush conduit 38 as defined by the three regions 60, 62 and 64 referred to in describing FIG. 5. More specifically, the bell shaped opening region 62, by virtue of its gradually converging surfaces 66, 68 restricts fluid separation of the fluid entering the inlet aperture 58. This gradual convergence creates a convergent flow without boundary layer separation. The curvature of the bell mouth is determined by equal radii 74, 76. The centers of curvature 78, 80 are separated by a distance which will vary with the size of the inlet aperture 58 in the vertical direction, preferably in the range of 3R to 4R. The number of degrees subtended by radii 74 and 76 are equal, forming a symmetrical bell mouth with convex converging surfaces 66, 68 in the direction of backflush flow. After traversing the bell mouth opening region 62, the convergent flow must then be matched in cross-sectional area to the tube region 60 and redirected 90 degrees by the transition region 64. In the embodiment shown, the transition region 64 further converges the flow to match tube region 60 which is much smaller in cross-sectional area than the bell mouth opening region 62. The upper concave surface 70 of the transition region 64 is formed in accordance with a radius 82 with a center of curvature 84. In the exemplary embodiment shown, the radius 82 has a length of approximately 0.85 R. The lower convex surface 72 is formed along an arc having radius 86 of approximately 0.45 R in length. The radii 76, 86 have a point of common tangency at Point 85 as do radii 74, 82 which is at point 87. A line drawn through these two points 86, 87 is approximately 0.55 R from a line parallel to the longitudinal axis of symmetry of the inlet aperture 58 in the embodiment shown.

Figure 7:
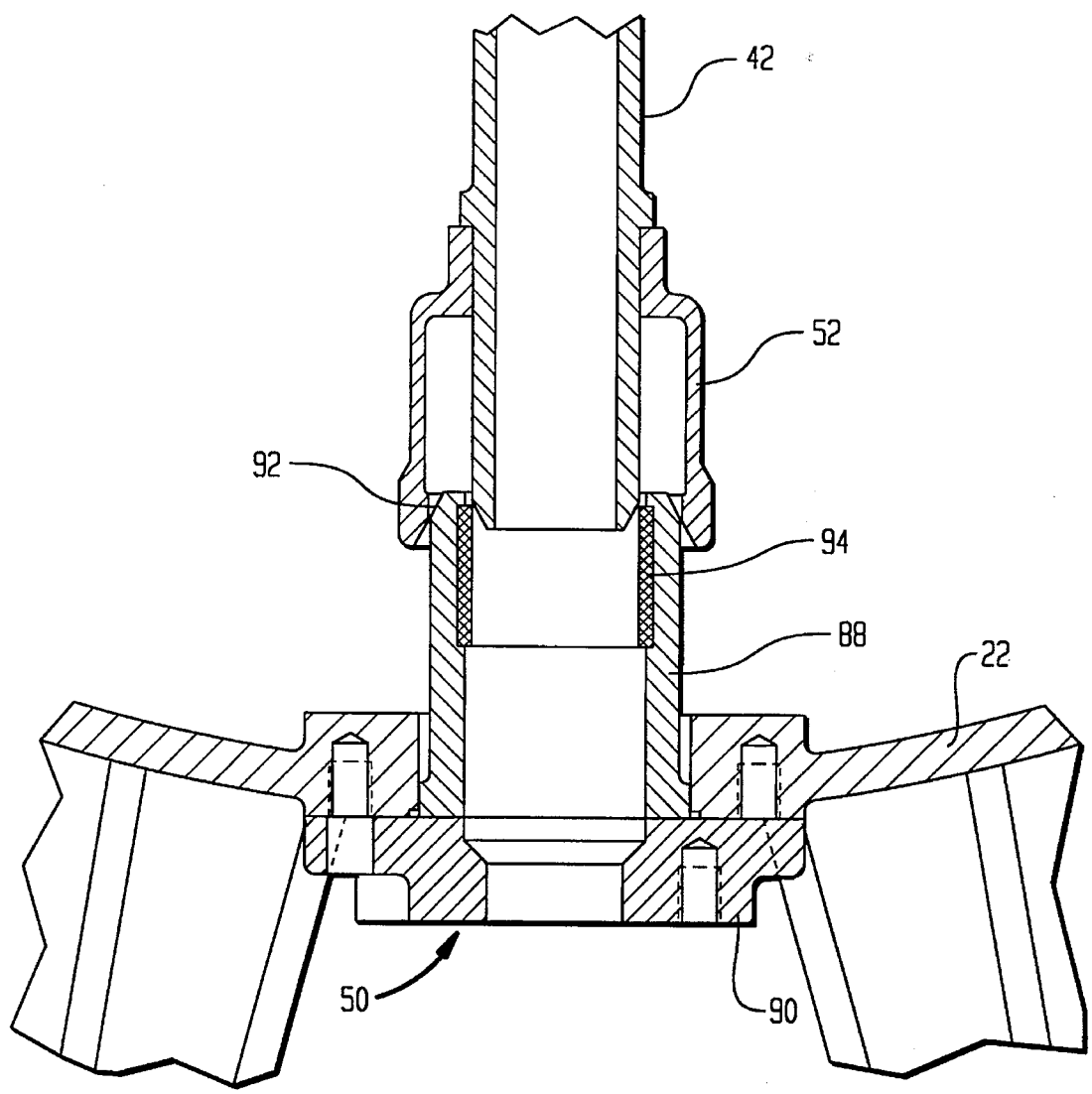
FIG. 7 is an enlarged view of a segment of FIG. 1 showing the lower portion of the backflush conduit output tube and lower sleeve assembly.

FIG. 7 shows the sleeve housing 50 protruding through bottom wall 22 of the filter 10. A sleeve receiver 88 extends upwards from a flange portion 90 of the sleeve housing 50. The outer diameter of the upper portion of the sleeve receiver 88 is slightly smaller than the bottom portion near the flange 90 to facilitate its introduction through the bore in the bottom wall 22. The upper outer peripheral edge 92 is chamfered to facilitate reception thereover of the guide 52 mounted to the output tube 42 of the backflush conduit 38 during assembly. As noted above, the sleeve receiver 88 accommodates a sleeve 94 press fit, threaded, glued, poured or otherwise held therein. The sleeve 94 receives the chamfered end of the output tube 42 thereby firmly establishing and maintaining an axis of rotation for the backflush conduit 38. As noted above, guide 52 seals the sleeve 94/tube 42 interface from debris and also aids in assembly by guiding the tube 42 into coaxial alignment with the sleeve 94 prior to contact between the tube and sleeve 42, 94. This prevents damage to the sleeve 94 resulting from misaligned insertion of tube 42. The aforesaid sleeve housing 50 and backflush conduit guide 52 are designed to promote ease of assembly despite close tolerances between the assembled components and unwieldy dimensions and bulk of the upper portion 12 of filter 10. Furthermore, guide 52 prevents unwanted fluid flows past the sleeve 94/tube 42 interface to waste.

FIGS. 8 and 9 show a perforated filter element 226 in accordance with the present invention. The element is a trilayer of two perforated cylinders, 228, 230 between which is sandwiched a layer of screening material 232. The trilayer is sintered or fusion welded together. The perforated openings 234 in each cylinder are concentrically aligned. Although a three layer embodiment is depicted in FIGS. 8 and 9, additional layers may be added to increase collapse strength. For example, a third perforated cylinder 235 (shown in phantom in FIG. 9) could be interposed into the center of the element shown. Preferably, the perforations of all cylinders are concentrically aligned. The cylinders and screening are preferably formed from stainless steel for corrosion resistance and strength. Due to its aligned, trilayer, construction, element 226 has high collapse strength while maintaining a high open area ratio. In contrast, many known laminate screens have non-aligned pores, such that open area is reduced geometrically with each succeeding layer. As a consequence of the improved combination of increased wall rigidity (collapse strength) and increased open area ratio, pore size may be decreased relative to a non-aligned element without increasing differential pressure. This allows the element to filter finer particles m the same rate of flow and input pressure as would be utilized to filter larger particles previously. In addition to improved filtration, the filter element of the present invention also enhances reverse or backflush flow for the same reason. Filter elements in accordance with the present invention may be used for large scale, high volume fine filtration applications, such as the removal of Zebra mussels from cooling water intakes. The aligned perforated laminate element shown in FIGS. 9 and 10 may be fabricated as follows. A woven mesh is placed between two perforated plates. The openings in the plates are coaxially aligned and held in alignment by dowels, pins or clamps. The trilayer is then tack welded and the temporary alignment means removed. The tack welded trilayer is then sinterbonded. After sinterbonding the laminate is rolled flat with a calendar roller and then rolled round by a press brake or other sheet bending apparatus. The resultant cylindrical laminate is welded along the terminal abutting edges to form a rigid cylindrical element. To finish the element, caps are bonded to the element with epoxy.

Figure 10:
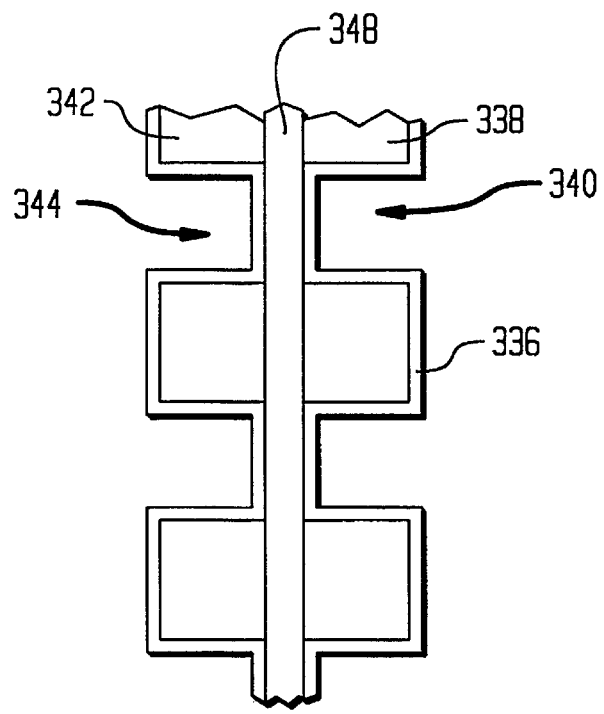
FIG. 10 is an enlarged, cross-sectional view of an alternative embodiment of the filter element of FIGS. 8 and 9.

FIG. 10 shows an enlarged, cross-sectional portion of another filter element in accordance with the present invention, wherein the structure illustrated in FIGS. 8 and 9 is coated with a non-stick coating, such as Teflon, to increase debris release characteristics. More specifically, a coating 336 has been applied to the surfaces of a trilayer composed of a first cylinder 338 having pores 340, a second cylinder 342 having pores 344 aligned with pores 340 and a screen 348 sandwiched therebetween.

Figure 11:
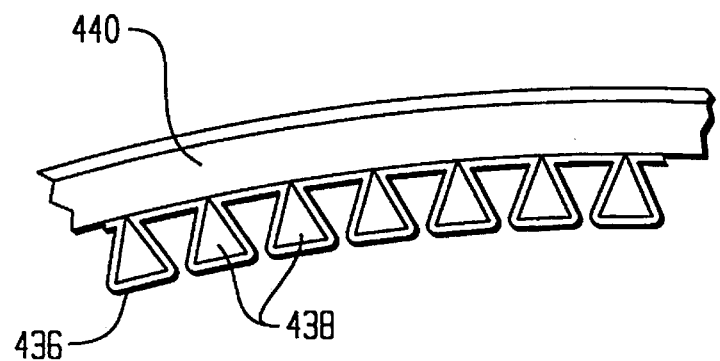
FIG. 11 is an enlarged, cross-sectional view of an alternative embodiment of the filter element of FIG. 1.

FIG. 11 shows an enlarged, cross-sectional portion of a filter element in accordance with the present invention wherein the filter element structure 26 illustrated in FIG. 1 is coated with a non-stick coating, such as Teflon, to increase debris release characteristics. More specifically, a coating 436 has been applied to the surfaces of a filter element made from a plurality of closely spaced, vertically oriented triangular bars 438 which are welded to circumscribing horizontal rings 440 such that a flat side faces toward the central vertical axis of symmetry of the element. This element configuration without a non-stick coating is known in the art and is sometimes referred to as a wedge wire or well screen element.

Figure 12:
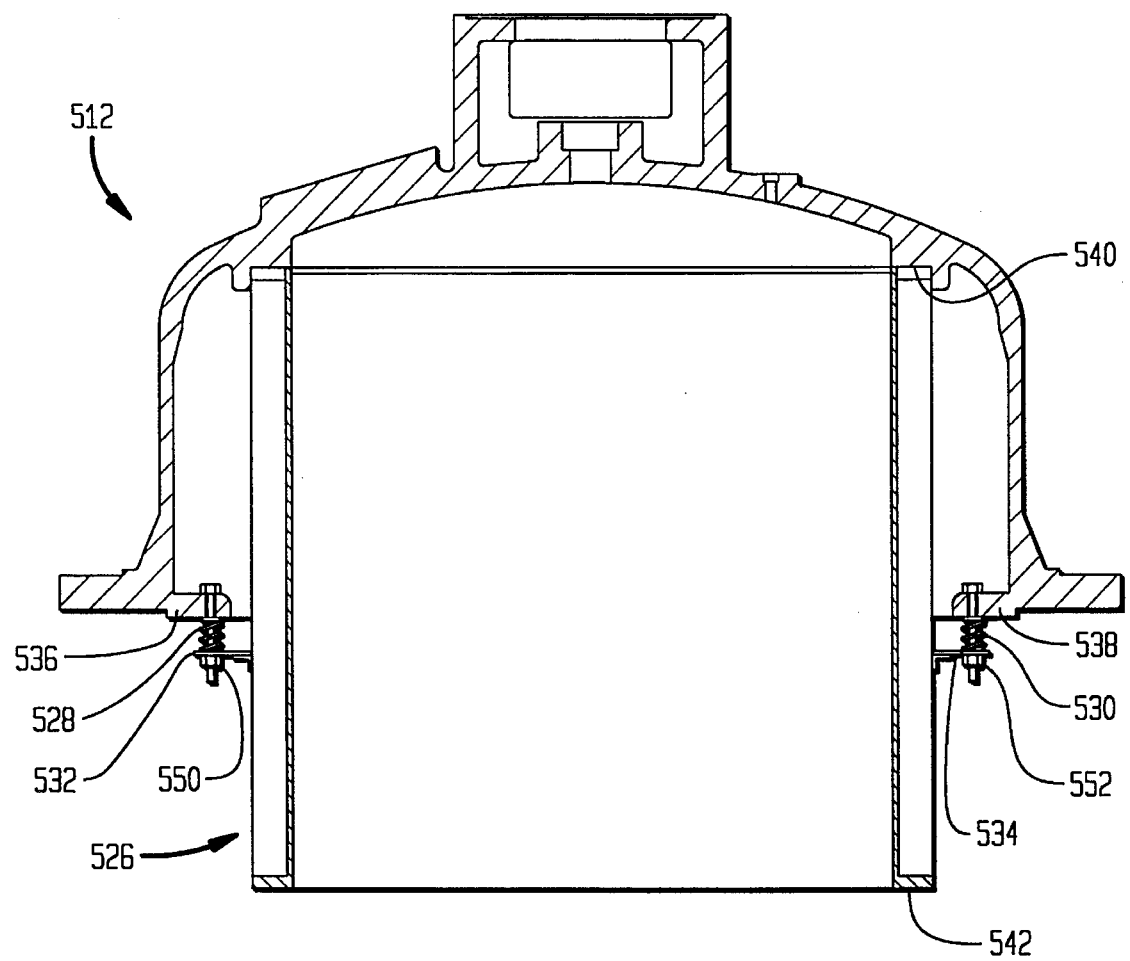
FIG. 12 is a cross-sectional view of the upper filter housing shown in FIG. 1 employing an alternative filter element retaining means.

FIG. 12 shows an alternative structure in accordance with the present invention for mounting the filter element 526 to the upper portion 512 of the filter. Specifically, springs 528, 530 have been interposed between the tabs 532, 536 and 534, 538. In the alternative, the springs 528, 530 could be interposed between tabs 532, 534 and nuts 550, 552. The springs 528, 530 provide a degree of freedom for the element 526 so that the top and bottom sealing surfaces 540, 542 of the element 526 are evenly compressed against their respective sealing surfaces during the assembly of the top and bottom portions 512, 514 of the filter.

It should be understood that the embodiments described herein are merely exemplary and that a person skilled in the art may make many variations and modifications without departing from the spirit and scope of the invention as defined in the appended claims.

We claim:

1. A backflush conduit for an automatic backflushing filter, comprising:
   a) a flared inlet portion converging inwardly from an inlet aperture in the direction of backflushing flow;
   b) an outlet portion having a generally cylindrical shape and oriented at an angle with respect to said inlet portion; and
   c) a transition portion connecting said inlet portion and said outlet portion, said transition portion turning through said angle while converging to said outlet portion, said inlet portion having an interior with upper and lower walls, said upper and lower walls being symmetrical and convex relative to each other and converging in the direction of backflushing flow through said conduit toward said transition portion, said conduit having a streamlined interior contour to enhance fluid flow therethrough and supporting a substantially even rate of fluid flow across said inlet aperture.

2. A backflush conduit in accordance with claim 1, wherein said transition portion has an interior with upper and lower walls, said upper wall being concave relative to said lower wall and said lower wall being convex relative to said upper wall.

3. The backflush conduit of claim 2, wherein said angle is between 45 and 90 degrees.

4. A backflush conduit for an automatic backflushing filter, comprising:
   a) a flared inlet portion converging inwardly from an inlet aperture in the direction of backflushing flow;
   b) an outlet portion having a generally cylindrical shape and oriented at an angle with respect to said inlet portion; and
   c) a transition portion distal to said inlet aperture and connecting said inlet portion and said outlet portion, said transition portion turns through said angle while converging toward the outlet portion, said transition portion having an interior with upper and lower walls, said upper wall being concave relative to said lower wall and said lower wall being convex relative to said upper wall, the interior surface contour of said upper and lower walls of said transition portion being formed along associated arcs subtended by a first radius having a length in a range of about 0.50 R to 0.90 R and a second radius having a length in a range of about 0.25 R to 0.50 R, respectively.

5. A backflush conduit in accordance with claim 4, wherein said first radius associated with said transition region is of length 0.85 R and said second radius associated with said transition region is of length 0.45 R.

6. A backflush conduit for an automatic backflushing filter, comprising:
   a flared inlet portion converging inwardly from an inlet aperture in the direction of backflushing flow;
   b) an outlet portion having a generally cylindrical shape and oriented at an angle with respect to the inlet portion; and
   c) a transition portion connecting said inlet portion and said outlet portion, said transition portion turns through said angle while converging to said outlet portion, said inlet portion having an interior with upper and lower walls, said upper and lower walls being symmetrical and convex relative to each other, the interior surface contour of said upper and lower walls being formed along associated arcs subtended by a pair of spaced, equal radii of length R.

7. A backflush conduit in accordance with claim 6, wherein said inlet aperture comes to a sharp distal edge.

* * * * *